United States Patent
Lehner et al.

(10) Patent No.: US 6,918,288 B2
(45) Date of Patent: Jul. 19, 2005

(54) METHOD FOR ENGINE MISFIRE DETECTION IN MULTI-CYLINDER INTERNAL COMBUSTION ENGINES WITH MULTI-CYLINDER SPARK IGNITION

(75) Inventors: Michael Lehner, Muehlacker (DE); Heiko Oertel, Stuttgart-Weilimdorf (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 09/958,539

(22) PCT Filed: Jan. 24, 2001

(86) PCT No.: PCT/DE01/00267

§ 371 (c)(1),
(2), (4) Date: Nov. 30, 2001

(87) PCT Pub. No.: WO01/59422

PCT Pub. Date: Aug. 16, 2001

(65) Prior Publication Data

US 2002/0157459 A1 Oct. 31, 2002

(30) Foreign Application Priority Data

Feb. 11, 2000 (DE) ............................... 100 06 004

(51) Int. Cl.⁷ .............................................. G01M 15/00
(52) U.S. Cl. .................................... 73/117.3; 73/117.3
(58) Field of Search ................... 73/1.37, 47, 115, 73/116, 117.3, 118.1; 123/90.11, 359.12, 406.24, 419, 436, 479, 481, 406.29, 90.12, 630; 701/105, 110, 116, 99, 101, 111, 104

(56) References Cited

U.S. PATENT DOCUMENTS 5,747,679 A * 5/1998 Dietz et al. ................... 73/116

6,457,455 B2 * 10/2002 Baeuerle et al. ........ 123/406.24

FOREIGN PATENT DOCUMENTS

DE 41 38 765 7/1992

\* cited by examiner

Primary Examiner—Kamand Cuneo
Assistant Examiner—Monica D. Harrison
(74) Attorney, Agent, or Firm—Walter Ottesen

(57) ABSTRACT

The invention relates to a method for detecting combustion misfires in multi-cylinder internal combustion engines having several simultaneously igniting cylinders wherein, for each crankshaft rotation, rough running values are determined by measuring segment times, the segment times including the times, which correspond to the piston movement of individual cylinders after their ignition time point, wherein the crankshaft passes through an associated circular segment angular region. A combustion misfire is determined in the affected crankshaft circular segment regions from the determined rough running values LUT for crankshaft segment regions having several simultaneously igniting cylinders via a desired value comparison to a threshold value $SW_2$, which is lower in value than the threshold value $SW_1$ for the misfire check in crankshaft segment regions having individually igniting cylinders. For a combustion misfire in a crankshaft segment region having simultaneously igniting cylinders causing a misfire operation in one of these cylinders, a misfire operation is caused by a suitable engine intervention and by measuring the change of the rough running values in the crankshaft segment region having the simultaneously igniting cylinders, the cylinder is determined by the engine intervention which exhibits a combustion misfire without engine intervention.

4 Claims, 1 Drawing Sheet

METHOD FOR ENGINE MISFIRE DETECTION IN MULTI-CYLINDER INTERNAL COMBUSTION ENGINES WITH MULTI-CYLINDER SPARK IGNITION

FIELD OF THE INVENTION

The invention relates to a method for detecting combustion misfires in multi-cylinder internal combustion engines having several simultaneously igniting cylinders.

BACKGROUND OF THE INVENTION

Methods for detecting combustion misfires are utilized in spark-ignition engines in order to, on the one hand, detect an uneven engine running and to minimize the uneven running by suitable control arrangements while, on the other hand, and above all, to avoid a deterioration of exhaust-gas values and to protect the exhaust-gas catalytic converter. The rough running of the engine can, for example, be caused by valve coking or, in direct injecting engines, by quality scattering of the characteristic values of the injection valves. The deterioration of the exhaust gas values is caused by misfires as a consequence of an engine defect. If an engine defect is detected, which is apparent because of a misfire, then the driver can, for example, be advised thereof by a warning lamp in order to initiate a repair as rapidly as possible.

Such methods utilize the realization that a combustion which does not take place within a cylinder of an engine causes characteristic changes of the trace of the torque of the engine compared to normal operation. From the comparison of the torque traces, one can distinguish between normal operation of the engine without misfire and so-called misfire-burdened operation. A misfire-burdened operation of one or several cylinders contributes to the total torque trace of the engine with a reduced contribution. This contribution can be determined by detecting the actual torques of the cylinders via an evaluation of the time-dependent trace of the crankshaft rotation or the camshaft rotation. According to the species method, a crankshaft angular region is assigned to a specific region of the piston movement of each cylinder or several simultaneously ignited cylinders. The crankshaft angle region is characterized as a segment. The segments, which belong to each cylinder or to the cylinders, are, for example, realized by markings on a transducer wheel coupled to the crankshaft. The segment time is the time in which the crankshaft passes over the corresponding angular region of the segment and is essentially dependent upon the energy converted in the combustion stroke. As a consequence of defective torque contributions, misfires lead to an increase of the ignition-synchronously detected segment times which are determined for each segment by scanning the markings on the transducer wheel by a suitable sensor. The more even the engine runs, the less will be the differences between the individual segment times. As already known from the state of the art, for example, from DE-OS 4,138,765, an index for the rough running of the engine is computed from the differences of the segment times. Additional boundary conditions are mathematically compensated and are, for example, the increase of the engine rpm for a vehicle acceleration. The rough running value is computed for each ignition of a cylinder or of simultaneously igniting cylinders. In a subsequent method step, the rough running value is compared ignition-synchronously in a desired value comparator to a threshold value. If the determined rough running value exceeds the threshold value, then this is evaluated as a misfire of the affected cylinder. The threshold value is, if needed, dependent upon operating parameters such as load and rpm. If misfires are determined, then their number is added. When a specific misfire rate is exceeded then, for example, a suitable warning device indicates this unevenness.

The described method from the state of the art has proven itself principally for internal combustion engines having single igniting cylinders. In internal combustion engines having several simultaneously igniting cylinders, the problematic results that for a misfire detection for a crankshaft segment wherein, for example, two cylinders ignite simultaneously, no detection can take place as to which of the two cylinders has combustion misfires. Furthermore, for internal combustion engines having several simultaneously igniting cylinders, the problem is present that, for misfire-burdened operation of one of these cylinders, the drop in torque caused thereby is present and is measured at the crankshaft but, in contrast to the misfire of a single igniting cylinder, the torque reduction is considerably less because the other cylinder exhibits a normal combustion operation.

This has the consequence that, when comparing the rough running values of crankshaft segment regions having several simultaneously igniting cylinders, misfires, under certain circumstances, cannot be detected because of the threshold value which is necessarily set higher for a detection with an individual ignition.

SUMMARY OF THE INVENTION

The method of the invention for detecting misfires offers the advantage compared to the above that an allocation of misfires can even be undertaken when two cylinders ignite simultaneously and therefore provide a common torque contribution. Furthermore, it can be ensured that a reliable detection of combustion misfires results for several simultaneously igniting cylinders notwithstanding the disturbance spacing of the rough running values which is lower in this case. These advantages are achieved in that a combustion misfire in the affected crankshaft circular segment regions can be determined from the determined rough running values for crankshaft segment regions with several simultaneously igniting cylinders by a desired value comparison to a threshold value which, in value, is less than the threshold value for the misfire check in crankshaft segment regions having individually igniting cylinders. It is first assumed that a misfire is present in one of the simultaneously igniting cylinders. For determining which one of the cylinders is affected by the combustion misfire, a misfire operation is caused by a suitable engine intervention in one of the cylinders. This can be, for example, the prevention of the injection for the affected cylinder. After one cylinder is switched off or has been suppressed in this way, it is determined which one of the cylinders has a combustion misfire without an engine intervention by measuring the change of the rough running value in the affected crankshaft segment region with the simultaneously igniting cylinders. If the rough running values remain unchanged compared to the values determined before the engine intervention of the cylinder switchoff, then the switched-off cylinder was not participating in the generation of torque in advance of the switchoff. If the rough running value changes after switchoff of a cylinder, then it is assumed that the switched-off cylinder has no combustion misfires and, because of the switchoff, the affected crankshaft segment now supplies no torque contribution at all. The measurement of the change of the rough running values can, on the one hand, take place via a comparison of the values in advance and after the cylinder switchoff. However, it has been shown to be especially advantageous to carry out the measured rough running values in the context of a desired value comparison to the threshold value for the misfire detection in individual cylinder ignition. The threshold value here permits a reliable misfire detection and is simultaneously already stored in the system as a characteristic value.

Further special embodiments of the method of the invention result together with the technical teaching of claim 1 from the features of the dependent claims.

It has been shown to be practical in this context, for the additional check of misfire-burdened cylinders, to apply the engine intervention in a further method step to the cylinder which is not misfire burdened and which was at first not switched off. Simultaneously, the cylinder is switched in which has been predetermined as being burdened by misfires. After carrying out this method step, the change of the rough running value in the crankshaft segment region is determined by a further measurement. A corresponding increase of the rough running values serves as final indication that the cylinder, which is already recognized as misfire-burdened, is actually affected because, in this case, both cylinders do not supply a torque contribution because of the corresponding switchover.

The further measurement of the change of the rough running values, which was carried out in the context of the check, can also take place via a desired value comparison to the threshold value for the misfire detection in individual cylinder ignition.

BRIEF DESCRIPTION OF THE DRAWINGS

The invention will now be described with respect to the drawings wherein.

DESCRIPTION OF THE PREFERRED
EMBODIMENTS OF THE INVENTION

Figure 1:
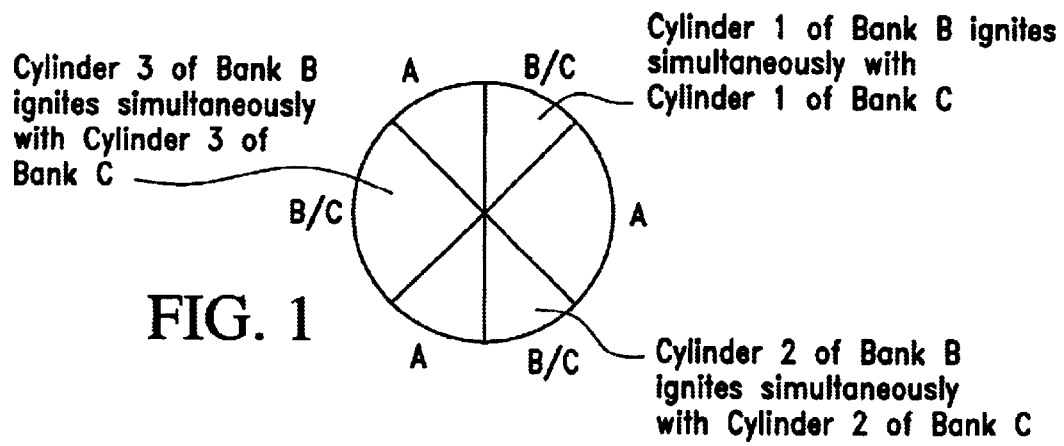
FIG. 1 is a schematic illustration of the crankshaft circular segments about ignition top dead center for an 18-cylinder engine; and, FIG. 2 is a flowchart of the method of the invention.

The method of the invention can, for example, be applied to an 18-cylinder engine. The engine is comprised of three cylinder banks A, B and C. A crankshaft revolution of 360 degrees is shown in FIG. 1 subdivided into six crankshaft segments. A total of six ignitions takes place in different cylinders of the engine during a crankshaft revolution. The cylinders of the cylinder bank A ignite individually; whereas, respective cylinders of cylinder banks B and C have a common ignition time point (B/C). The ignition sequence for a crankshaft revolution shown in FIG. 1 can be defined exemplarily as follows:
1st ignition operation: cylinder 1 of bank A;
2nd ignition operation: cylinder 1 of bank B simultaneously with cylinder 1 of bank C;
3rd ignition operation: cylinder 2 of bank A;
4th ignition operation: cylinder 2 of bank B simultaneously with cylinder 2 of bank C;
5th ignition operation: cylinder 3 of bank A; and,
6th ignition operation: cylinder 3 of bank B simultaneously with cylinder 3 of bank C.

The additional ignitions of the remaining cylinders take place in the same manner as the ignition sequence presented above.

Within the crankshaft segments shown in FIG. 1, the individual cylinders of cylinder bank A provide a torque contribution for each ignition and, in the same way, the commonly ignited cylinders of cylinder banks B and C provide a common torque contribution likewise during a crankshaft segment. The crankshaft segment sections correspond to the movement of a cylinder piston of the cylinder bank A or the cylinder banks B and C during the expansion phase of the combustion engine after the ignition time point.

The values of the rough running LUT, which are decisive for a detection of combustion misfires, result as functions of the segment times, that is, the times in which the crankshaft passes over the six individual part segments of a total revolution shown schematically in FIG. 1. An incomplete combustion or a combustion misfire within a crankshaft segment leads to a reduced torque output within this segment and, from this, there results an extension of the time span in which the crankshaft passes over the corresponding segment region. The segment times can, for example, be scanned by a transducer wheel connected to the crankshaft or camshaft on which segment region boundaries are marked, which can be scanned by a suitable sensor. The rough running values LUT are formed therefrom in a manner known from the state of the art and serve as basic values of the misfire detection.

Before the determined rough running values LUT are used for the misfire detection, possibly present transducer wheel defects (inaccuracies of the marking) can be corrected, for example, via fuelon adaptation by switching in correction elements.

Figure 2:
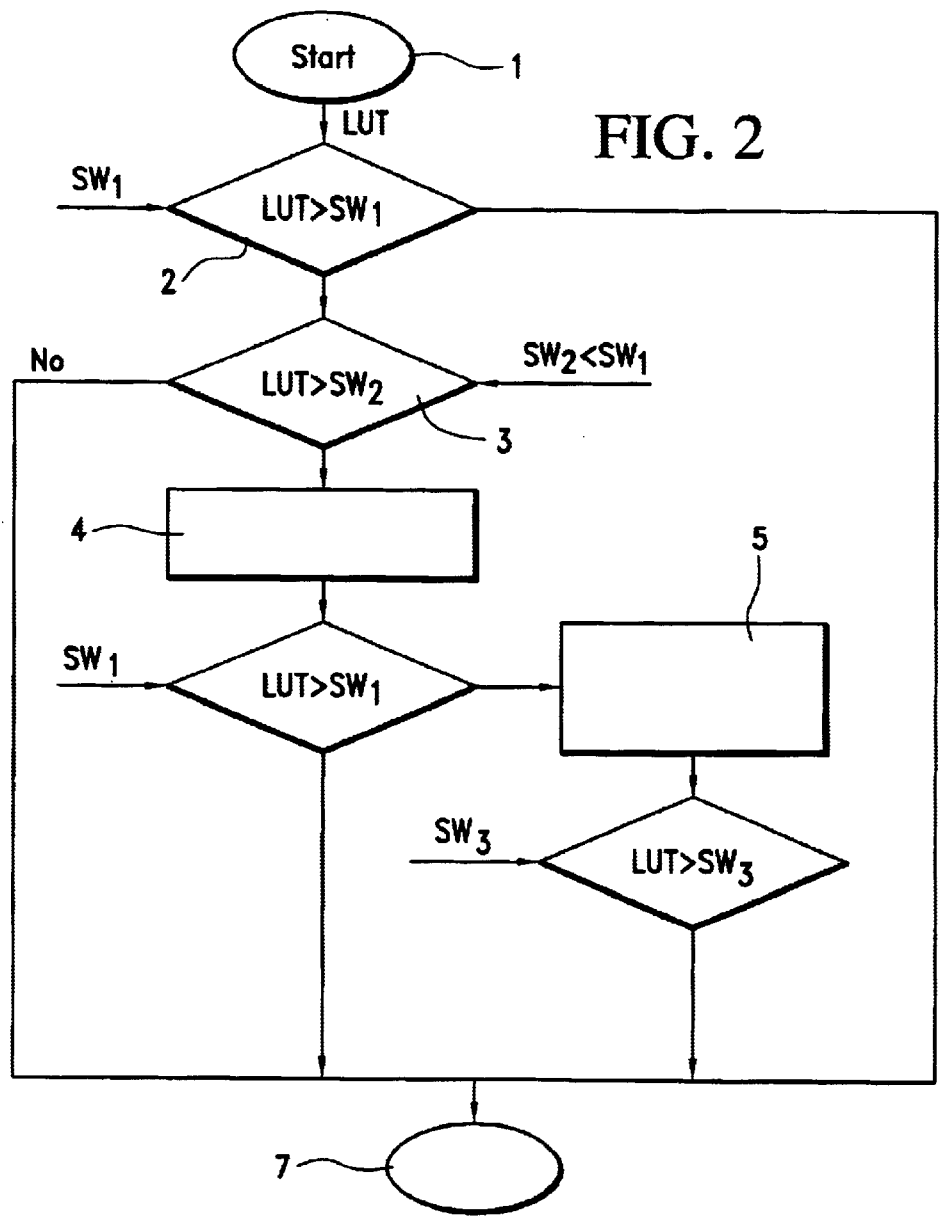

In FIG. 2, and in the context of a block circuit diagram, the method for misfire detection is shown in an 18-cylinder engine having three cylinder banks A, B and C. After computing the rough running values LUT in a computation unit 1, these values are supplied to a comparator component 2. The inputted rough running value LUT is compared to a threshold value $SW_1$ in the comparator component 2. Simultaneously, a check takes place as to whether the rough running values belong to a segment of cylinder bank A (that is, to an individually igniting cylinder) or whether the value is to be assigned to the cylinder banks B and C (that is, to simultaneously igniting cylinders of these cylinder banks). For reasons of clarity, the inquiry as to to which of the two segment types of the particular rough running value LUT is to be allocated, is not shown in FIG. 2.

If the evaluation unit 2 determines that the rough running value LUT of a segment of cylinder bank A is greater than the threshold value $SW_1$, then a misfire of the affected cylinder is present. This information can be supplied to a control unit 7 which computes cylinder-individual equalization factors or correction factors for a change of the injection time or of the ignition time point of the cylinder affected by the combustion misfire on the basis of the determined rough running values so that future misfires can be avoided after correction of the ignition time point or injection time.

As an alternative to the computation oft cylinder-individual equalization factors or correction factors, a counting of the misfires of the affected cylinder can be undertaken in order to indicate to the driver when there is a corresponding misfire number as to a possible defect in the engine, for example, by the illumination of a warning lamp. The method described until now is unproblematic with respect to the accuracy of its misfire detection for those segment regions which are assigned to the cylinder bank A having the individually igniting cylinders. If a combustion misfire takes place in the simultaneously igniting cylinders of cylinder banks B and C, then the outputted torque reduces, compared to the segments of cylinder bank A, only by 50% of that torque reduction which would occur by the inoperability of a cylinder of cylinder bank A. The threshold value $SW_1$ applied to the comparison is selected with a corresponding safety factor. For this reason, because of the lesser torque reduction and the lower values of the rough running value LUT resulting therefrom, it cannot be excluded that a combustion misfire of one of the two simultaneously igniting cylinders of cylinder banks B and C is not recognized as a misfire. For this reason, the determined rough running value LUT is supplied to a second comparator unit 3 wherein this rough running value LUT is compared to a second threshold value $SW_2$. If the rough running value LUT is less than the threshold value $SW_2$, then, according to evaluation component 3, no combustion misfire is present in the two simultaneously igniting cylinders and the combustion misfire detection is interrupted.

If, in contrast, the evaluation component 3 determines that the rough running value LUT is greater than the second threshold value $SW_2$, then it can be assumed that one of the two simultaneously igniting cylinders has a combustion misfire. In this case, one of the two cylinders is switched off by a control unit 4 and, in the presently shown embodiment, this is the cylinder of the cylinder bank B. The switchoff takes place, for example, by preventing the injection which has the consequence that an artificial misfire operation is caused in the affected cylinder. With the cylinder switchoff, two possibilities are given for the continuously determined rough running values LUT of the two simultaneously igniting cylinders. If the switched-off cylinder is, simultaneously, the cylinder burdened originally with misfires, then the rough running values will not change because, in this case, the torque, which is supplied by the second cylinder, is made available as before. In this case, a checking method can provide additional reliability that, in the present case, the cylinder of the cylinder bank B is misfire burdened. This check method functions for a further assurance and is explained further hereinafter.

The second possibility which results from the switchoff of the cylinder of cylinder bank B is an increase of the rough running values LUT of the corresponding crankshaft segment. Such an increase occurs when the switched-off cylinder (that is, in this case, the cylinder of cylinder bank B) was not misfire burdened in advance of the switchoff. In this case, an increase of the rough running values indicates that now the misfire-burdened cylinder of the cylinder bank C as well as the switched-off cylinder of the cylinder bank B provide no torque contribution. From this follows that misfires are present at the cylinder of cylinder bank C which can either be eliminated by means of equalization factors or correction factors for the injection time or the ignition time point (computed from the already existing rough running values LUT) or can be counted when there are defects on the engine and, when there is a corresponding number, they can be announced to the driver so that the driver can initiate a repair.

In this way, because of the fact that, when switching off one of the simultaneously igniting cylinders, an increase of the rough running values takes place or not, a decision is given as to which of the cylinders of cylinder banks B and C is burdened by misfires.

In FIG. 2, two additional method steps are presented as supplementary, which can serve as additional assurance as to whether the cylinder of cylinder bank C, which has been determined up to now in the described method, is actually misfire burdened.

The supplementary method steps provide that, after the check of the change of the rough running values as a consequence of the cylinder switchoff, in the case wherein no increase of the rough running value occurs, the cylinder of the cylinder bank B, which up to then had been switched off, is switched in again by a control unit 5 whereupon the corresponding cylinder of cylinder bank C is switched off. If, thereafter, an increase of the rough running values for the affected crankshaft segment occurs, then a conclusion can be drawn with absolute certainty that a misfire-burdened operation is present on the cylinder of cylinder B which is again switched in.

The check of the rough running values LUT as to whether an increase is present for these rough running values after switchoff of a cylinder bank can take place in that a desired value comparison of the rough running values LUT to threshold values $SW_3$ is carried out. The threshold values $SW_3$ can correspond in their order of magnitude to those of threshold value $SW_1$.

In addition to the use in internal combustion engines having several simultaneously igniting cylinders, the described method of the invention can also be utilized in internal combustion engines wherein two spark plugs are provided in one cylinder for improving combustion of the gas mixture. Here, the method can be used to scan the non-operation of a spark plug because, in this case too, a drop in torque occurs in the corresponding crankshaft segment. When using the method, the threshold values $SW_1$, $SW_2$ and $SW_3$ are to be correspondingly adapted because, for a non-operation of a spark plug, this leads to only a maximum torque drop of 20% compared to the use of the above-described method for two simultaneously igniting cylinders. Furthermore, it is conceivable to compute the rough running values LUT directly from the different torque values of the individual crankshaft segments. The torque values are determined via a torque sensor on the crankshaft without it being necessary to determine the rough running values via the detour of the determination of segment times.

What is claimed is:

1. A method for detecting combustion misfires in multi-cylinder internal combustion engines having several simultaneously igniting cylinders, the method comprising the steps of:

determining rough running values for each crankshaft rotation by measuring segment times, the segment times including the times, which correspond to the piston movement of individual cylinders after their ignition time point, wherein the crankshaft passes through an associated circular segment angular region;

determining a combustion misfire from the determined rough running values for circular segment angular regions of individually igniting cylinders via a desired value comparison to a first threshold value $SW_1$ with the combustion misfire being in this crankshaft circular segment region;

assuming a combustion misfire in the affected crankshaft circular segment regions from the determined rough running values LUT for crankshaft segment regions having several simultaneously igniting cylinders by making a desired value comparison to a second threshold value $SW_2$, which is lower in value than the first threshold value $SW_1$ for the misfire check in crankshaft segment regions having individually igniting cylinders;

for an assumed misfire in a crankshaft segment region having simultaneously igniting cylinders, causing a misfire operation in one of these cylinders with suitable engine intervention; and, determining the cylinder which has a combustion misfire without engine intervention by measuring the change of the rough running values in the crankshaft segment region having the simultaneously igniting cylinders after causing misfire operation caused by the engine intervention.

2. The method for combustion misfire detection of claim 1, wherein the measurement of the change of the rough running values LUT in crankshaft segment regions having simultaneously igniting cylinders takes place by making a desired value comparison to the threshold value $SW_1$ for the misfire detection for individual cylinder ignition.

3. The method for combustion misfire detection of claim 1, wherein:

for checking the misfire burdened combustion operation, the engine intervention for causing misfire operation is applied to a cylinder not burdened by misfire and, simultaneously, the cylinder, which is determined as misfire burdened, is switched in; and, thereafter, making a further measurement of the change of the rough running values in the affected crankshaft segment region with the simultaneously igniting cylinders.

4. The method for combustion misfire detection of claim 3, wherein the further measurement of the change of the rough running values LUT takes place in the crankshaft segment regions with simultaneously igniting cylinders by making a desired value comparison to the threshold values $SW_1$ for the combustion misfire detection for individual cylinder ignition.

* * * * *